(12) United States Patent
Hsiao

(10) Patent No.: US 11,097,657 B1
(45) Date of Patent: Aug. 24, 2021

(54) ILLUMINATED DOOR SILL PLATE HAVING CHANGEABLE BATTERIES

(71) Applicant: HON YU AUTO-PARTS CO., LTD., New Taipei (TW)

(72) Inventor: Yin-Teng Hsiao, New Taipei (TW)

(73) Assignee: HON YU AUTO-PARTS CO., LTD., New Taipei (TW)

( * ) Notice: Subject to any disclaimer, the term of this patent is extended or adjusted under 35 U.S.C. 154(b) by 0 days.

(21) Appl. No.: 17/189,266

(22) Filed: Mar. 2, 2021

(30) Foreign Application Priority Data

Mar. 6, 2020 (TW) ................. 109107454

(51) Int. Cl.
| | |
|---|---|
| *B60Q 3/217* | (2017.01) |
| *F21V 19/00* | (2006.01) |
| *F21S 9/02* | (2006.01) |
| *F21V 17/10* | (2006.01) |
| *B60Q 3/62* | (2017.01) |
| *F21V 3/02* | (2006.01) |
| *F21V 8/00* | (2006.01) |
| *F21W 106/00* | (2018.01) |
| *F21Y 115/10* | (2016.01) |

(52) U.S. Cl.
CPC ............. *B60Q 3/217* (2017.02); *B60Q 3/62* (2017.02); *F21S 9/02* (2013.01); *F21V 3/02* (2013.01); *F21V 17/105* (2013.01); *F21V 19/001* (2013.01); *F21W 2106/00* (2018.01); *F21Y 2115/10* (2016.08); *G02B 6/0011* (2013.01)

(58) Field of Classification Search
CPC .......... B60Q 3/217; B60Q 3/62; B60Q 1/323; F21V 19/001; F21V 17/105; F21V 3/02; F21V 31/00; F21S 9/02; F21W 2106/00; F21Y 2115/10; G02B 6/0011
See application file for complete search history.

(56) References Cited

U.S. PATENT DOCUMENTS 8,702,290 B2 *  4/2014  Yang ........................ B60Q 3/80
                                                          362/540
10,908,349 B2 *  2/2021  Cheng .................. G02B 6/0073
(Continued)

FOREIGN PATENT DOCUMENTS

| CN | 207207908 U | 4/2018 |
| GN | 206155313 U | 5/2017 |

(Continued)

*Primary Examiner* — Peggy A Neils
(74) *Attorney, Agent, or Firm* — Bruce Stone LLP; Joseph A. Bruce

(57) ABSTRACT

An illuminated door sill plate contains: a base and a removable cover. The base includes an elongated case, a waterproof plate, a PCB having a light-emitting diode (LED), a light guide plate, and at least one changeable battery. The elongated case has a light emitting portion, multiple engagement portions, at least one first receiving orifice, and at least one battery cover. The removable cover includes an elongated body connected with a nameplate, and the nameplate has a light transmission portion formed on center of the nameplate in multiple character shapes and configured to transmit lights, an elongated groove formed on center of a top of the elongated body, and multiple hooks extending from two long sides of the elongated groove and engaged with the multiple engagement portions so that the base is connected with or removed from the removable cover.

6 Claims, 3 Drawing Sheets

(56) References Cited

U.S. PATENT DOCUMENTS

| | | | | |
|---|---|---|---|---|
| 2016/0257244 A1* | 9/2016 | Oliverio | ................ | F21S 43/237 |
| 2018/0320839 A1* | 11/2018 | Briscoe | ................ | F21V 21/096 |
| 2020/0041081 A1 | 2/2020 | Hsiao | | |

FOREIGN PATENT DOCUMENTS

| | | |
|---|---|---|
| TW | 380262 U | 5/2010 |
| TW | 538889 U | 4/2017 |
| TW | 202007561 A | 2/2020 |

* cited by examiner ically door sill plate having
changeable batteries

FIELD OF THE INVENTION

The present invention relates to an illuminated door sill plate which contains multiple changeable batteries capable of replaced easily.

BACKGROUND OF THE INVENTION

A conventional illuminated door sill plate is mounted on a car door threshold of a vehicle and is configured to display trademark logo or car's name.

An improved illuminated door sill plate contains at least one battery configured to supply power to a light emitting element so as to eliminate a wire fixed in a power supply unit of the vehicle and to avoid interfacing an electric circuit.

The improved illuminated door sill plate is one-piece sealed. When changing the battery, the improved illuminated door sill plate is detached from the car door threshold, and the bottom of the improved illumination sill plate can be opened to change the battery.

However, it is easy to damage the base and the light guide plate after assembling or removing the improved illuminated door sill plate from the car door threshold.

Furthermore, a protective cover is fixed on the bottom of the improved illuminated door sill plate, so it can accumulate moistures inside and can damage the battery and a light emitting unit easily.

The present invention has arisen to mitigate and/or obviate the afore-described disadvantages.

SUMMARY OF THE INVENTION

The primary aspect of the present invention is to provide an illuminated door sill plate which contains changeable batteries capable of changing easily by removing a removable cover quickly.

Another aspect of the present invention is to provide an illuminated door sill plate which contains a battery cover covered by the removable cover to protect the changeable batteries.

To obtain above-mentioned aspects, an illuminated door sill plate provided by the present invention contains: a base and a removable cover.

The base includes an elongated case and a waterproof plate connected with a bottom of the elongated case so as to form an accommodation space between the elongated case and the waterproof plate, a PCB (Printed circuit board) accommodated in the accommodation space and having a light-emitting diode (LED), a light guide plate defined between the elongated case and the PCB, and at least one changeable battery. The elongated case has a light emitting portion arranged on the elongated case, multiple engagement portions arranged on two long sides of the elongated case, at least one first receiving orifice defined proximate to two short sides of a top of the elongated case, and battery cover configured to cover the at least one first receiving orifice.

The removable cover includes an elongated body connected with a nameplate, and the nameplate includes a light transmission portion formed on a center of the nameplate in multiple character shapes and configured to transmit lights, an elongated groove formed on a center of a top of the elongated body, and multiple hooks extending from two long sides of the elongated groove and engaged with the multiple engagement portions so that the base is connected with or is removed from the removable cover.

wherein two ends of the removable cover accommodate two magnets so as to be attached on a car door threshold.

Preferably, the elongated body of the removable cover has a stepped face formed on the top thereof, two notches defined adjacent to two short sides of the top of the elongated body, and the respective notch is located adjacent to a respective short side of the elongated body and accommodates magnet to attach the nameplate.

Preferably, the nameplate is made of metal, the light transmission portion of the nameplate passes through the nameplate, and the lights emit out of the light transmission portion from the light emitting portion of the elongated case in three-dimensional character shapes.

Preferably, the nameplate is made of translucent plastic, and the light transmission portion passes through the nameplate and is formed in a shading printing manner, such that the lights emit out of the light transmission portion from the light emitting portion of the elongated case in flat character shapes.

Preferably, the removable cover includes two guide posts, and a respective guide post extends from the bottom of the elongated body and is located proximate to a respective short side of the bottom of the elongated body.

Preferably, a bottom of the base is fixed on a car door threshold.

DETAILED DESCRIPTION OF THE PREFERRED EMBODIMENTS

Figure 1:
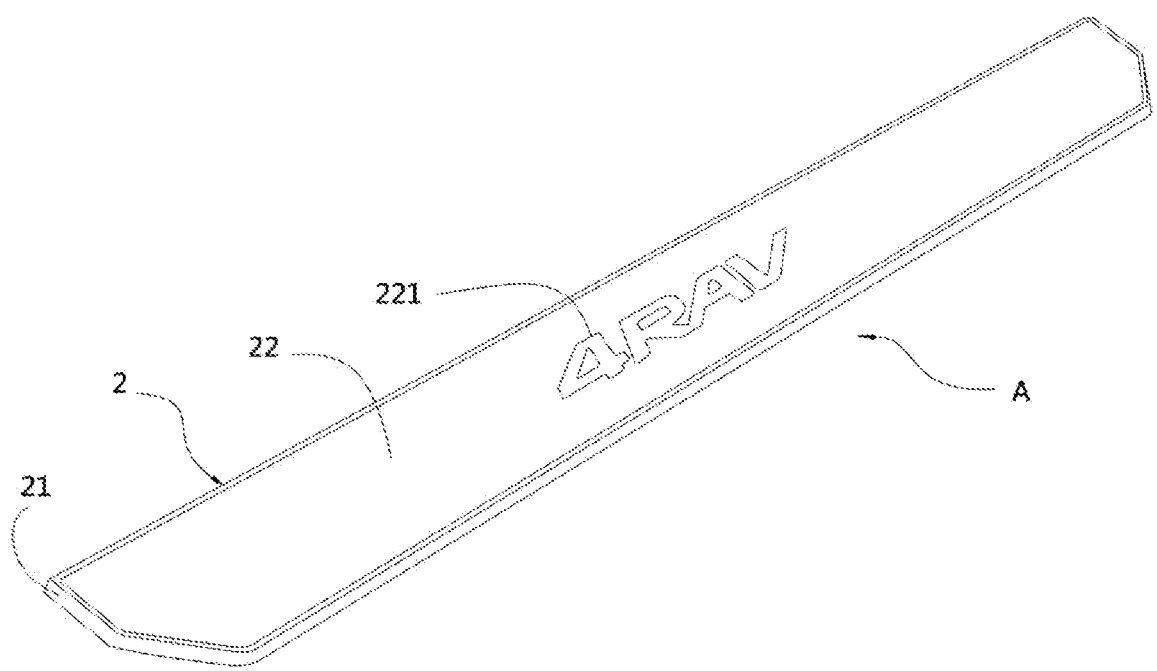
FIG. 1 is a perspective view showing the assembly of an illuminated door sill plate according to a preferred embodiment of the present invention.
Figure 2:
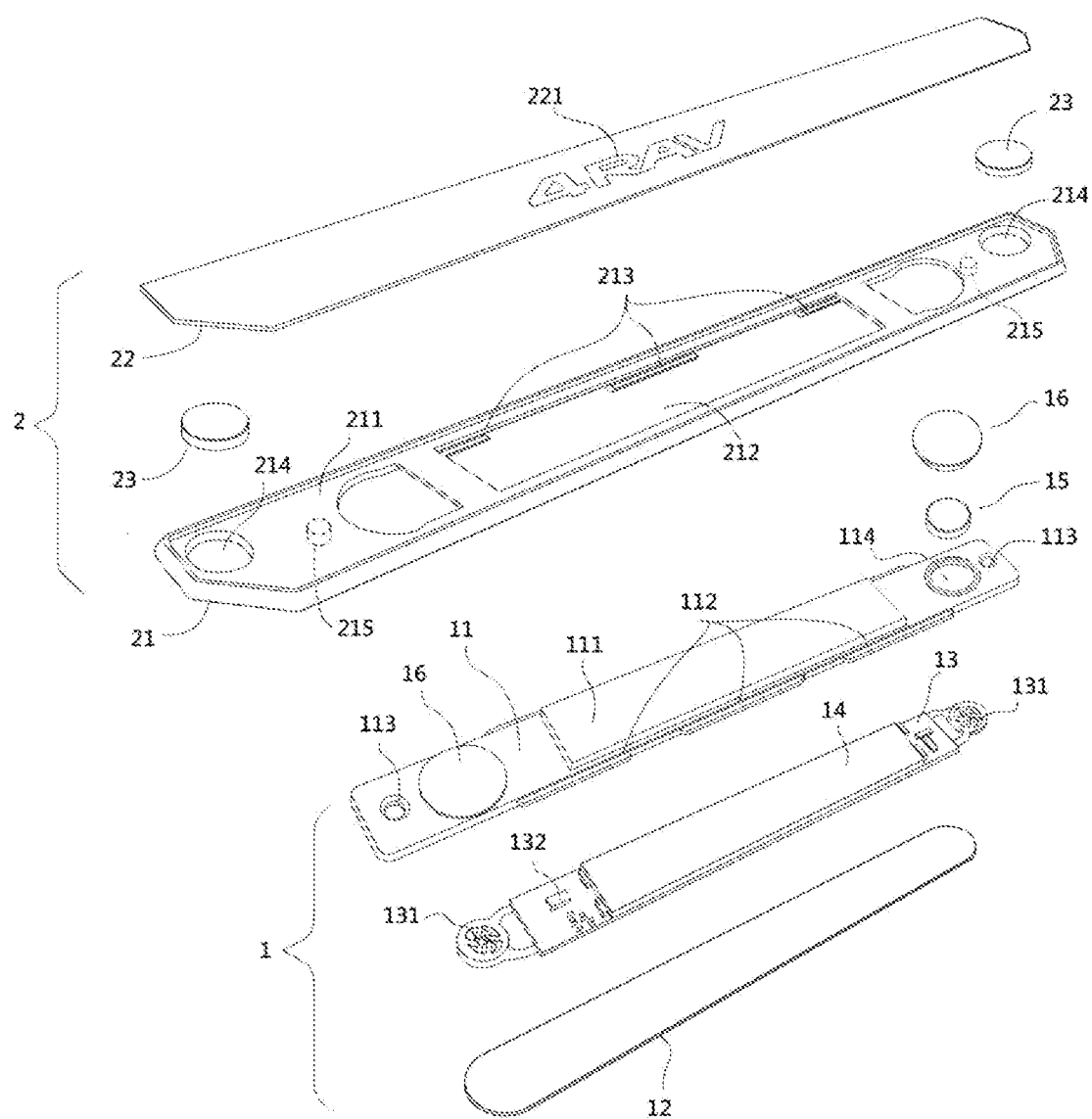
FIG. 2 is a perspective view showing the exploded components of the illuminated door sill plate according to the preferred embodiment of the present invention.
Figure 3:
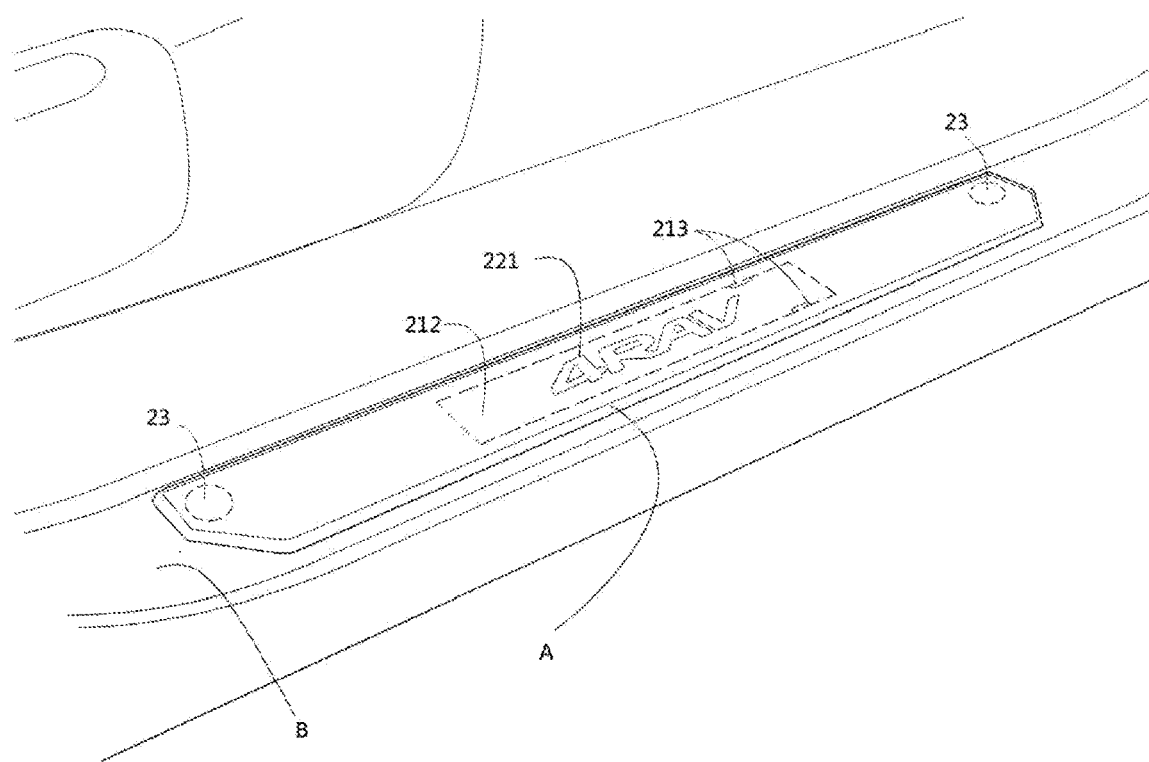
FIG. 3 is a perspective view showing the application of the illuminated door sill plate according to the preferred embodiment of the present invention.

With reference to FIGS. 1-3, an illuminated door sill plate A according to a preferred embodiment of the present invention is mounted on a car door threshold B and comprises: a base 1 and a removable cover 2 on which a light transmission portion 221 is arranged so as to emit lights when opening a car door and off the lights when closing the car door.

Referring to FIG. 2, the removable cover 2 includes an elongated body 21, and the elongated body 21 has a stepped face 211 formed on a top thereof, an elongated groove 212 formed on the center of the top of the elongated body 21, multiple hooks 213 extending from two long sides of the elongated groove 212, two notches 214 defined adjacent to two short sides of the top of the elongated body 21, and two guide posts 215, wherein a respective guide post 215 extends from a bottom of the elongated body 21 and is located proximate to a respective short side of the bottom of the elongated body 21.

A nameplate 22 is made of metal or translucent plastic and includes adhesive arranged around a bottom of the nameplate 22 so as to adhere the nameplate 22 on the stepped face 211 of the elongated body 21. The nameplate 22 has the light transmission portion 221 formed on the center thereof in multiple character shapes and configured to transmit the lights.

When the nameplate 22 is made of the metal, the light transmission portion 221 passes through the holes or shape on the nameplate 22; when the nameplate 22 is made of the translucent plastic, the light transmission portion 221 passes through the nameplate 22 by in form of a shading printing manner.

The respective notch 214 is located adjacent to a respective short side of the elongated body 21 and accommodates a magnet 23 to attach the nameplate 22. Thereby, the illuminated door sill plate A is mounted on the car door threshold B of the vehicle by ways of the magnet 23 of the respective notch 214.

The multiple hooks 213 are configured to engage with the base 1.

The two guide posts 215 of the elongated body 21 are configured to guide the removable cover 2 to connect with or remove from the base 1.

Referring to FIG. 2, the base 1 includes an elongated case 11 and a waterproof plate 12 connected with a bottom of the elongated case 11 so as to form an accommodation space between the elongated case 11 and the waterproof plate 12, a PCB 13 accommodated in the accommodation space and having a light-emitting diode (LED), a light guide plate 14 defined between the elongated case 11 and the PCB 13, and changeable batteries 15.

The PCB 13 has two conductive elements 131, and a respective conductive element 131 is fixed on each of two short sides of the PCB 13.

The elongated case 11 is one-piece formed from plastic, having a light emitting portion 111 arranged on a center thereof, and multiple engagement portions 112 arranged on two long sides of the elongated case 11 and engaged with the multiple hooks 213, such that the elongated case 11 is engaged with or disengaged from the elongated body 21.

When the nameplate 22 is made of the metal and the light transmission portion 221 passes through the nameplate 22, the lights emit out of the light transmission portion 221 from the light emitting portion 111 of the elongated case 11 in three-dimensional character shapes.

When the nameplate 22 is made of the translucent plastic and the light transmission portion 221 passes through the nameplate 22, the lights emit out of the light transmission portion 221 from the light emitting portion 111 of the elongated case 11 in flat character shapes.

The elongated case 11 has at least one first receiving orifice 114 defined proximate to two short sides of the top thereof and configured to receive the changeable batteries 15, and the elongated case 11 has a battery cover 16 configured to cover the at least one first receiving orifice 114, thus waterproofing the batteries 15.

The elongated case 11 further has two second receiving orifices 113, wherein a respective second receiving orifice 113 is defined between a respective first receiving orifice 114 and a respective short side of the top of the elongated case 11 and is configured to receive the respective guide post 215, wherein the respective second receiving orifice 113 is stepped.

As shown in FIG. 3, after the base 1 and the removable cover 2 are connected to form the illuminated door sill plate A, the illuminated door sill plate A is mounted on the car door threshold B, wherein a sensor switch 132 is on the PCB 13 can detect when car door open, the lights emit the light transmission portion 221, and lights off after car door close.

The multiple engagement portions 112 are engaged with the multiple hooks 213 so that the base 1 is connected with the removable cover 2 to form the illuminated door sill plate A, and the illuminated door sill plate A is mounted on the car door threshold B by using the magnet 23 of the elongated body 21.

Figure 4:
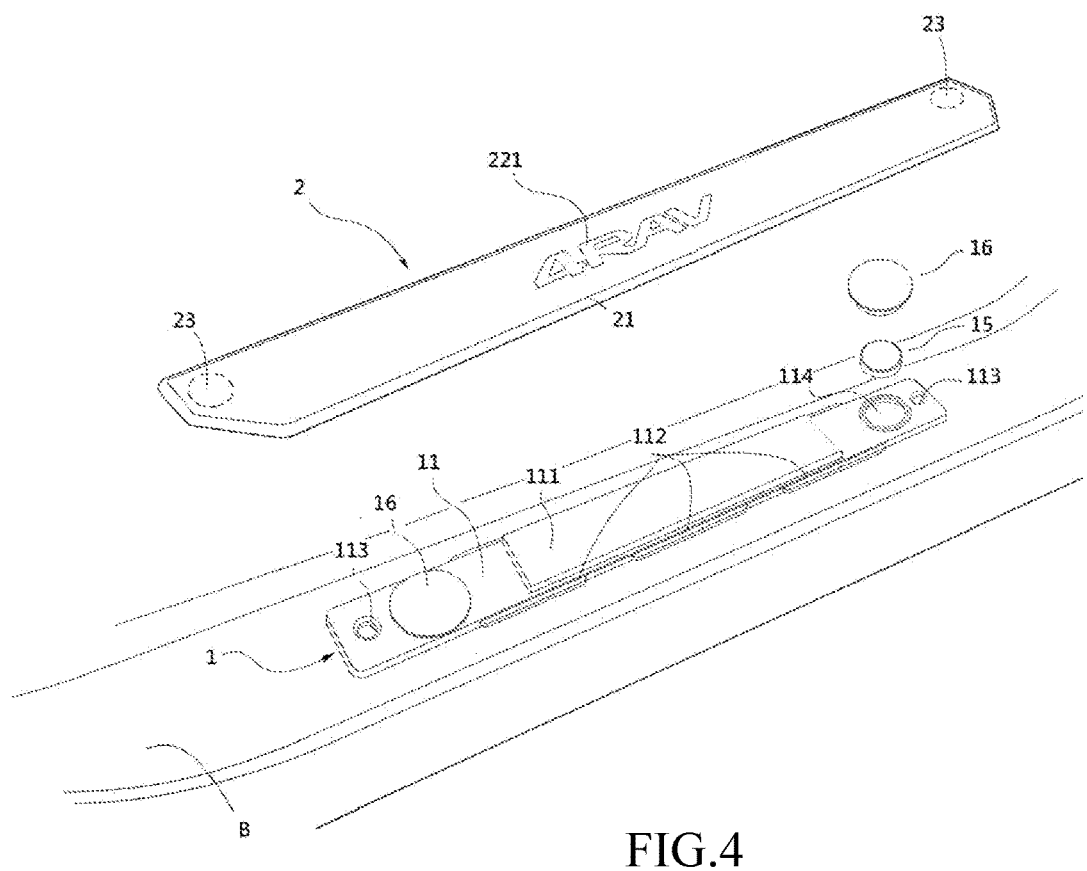
FIG. 4 is a perspective view showing changing battery of the illuminated door sill plate according to the preferred embodiment of the present invention.

Preferably, the changeable batteries 15 are changeable after running out of electricity. Referring to FIG. 4, the removable cover 2 is removed from the elongated case 11 so that the magnet 23 is moved away from the car door threshold B, and the multiple engagement portions 112 are disengaged from the multiple hooks 213, thus detaching the removable cover 2 from the base 1.

A bottom of the base 1 is adhered by a double-sided tape or is engaged on the car door threshold B, so the base 1 is still fixed on the car door threshold B after detaching the removable cover 2, and a battery cover 16 is opened to change the changeable batteries 15. Thereafter, the battery cover 16 is closed, and the removable cover 2 is connected back with the base 1.

As illustrated in FIG. 2, when connecting and removing the removable cover 2 with or from the base 1, the two guide posts 215 are configured to guide the removable cover 2, and the two second receiving orifices 113 are configured to guide the base 1.

Thereby, the changeable batteries 15 can be easily changed by removing or connecting the removable cover 2 from or with the base 1 and by opening or closing the battery cover 16. Preferably, the battery cover 16 is covered by the removable cover 2 to protect the changeable batteries 15.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An illuminated door sill plate comprising:
a base including an elongated case and a waterproof plate connected with a bottom of the elongated case so as to form an accommodation space between the elongated case and the waterproof plate, a PCB accommodated in the accommodation space and having a light-emitting diode (LED), a light guide plate between the elongated case and the PCB, and at least one changeable battery, wherein the elongated case has a light emitting portion arranged on the elongated case, multiple engagement portions arranged on two long sides of the elongated case, at least one first receiving orifice defined proximate to two short sides of a top of the elongated case, and at least one battery cover configured to cover the at least one first receiving orifice; and
a removable cover including an elongated body connected with a nameplate, and the nameplate including a light transmission portion formed on center of the nameplate in character shapes and configured to transmit lights, an elongated groove formed on center of a top of the elongated body, and multiple hooks extending from two long sides of the elongated groove and engaged with the multiple engagement portions so that the base is connected with or is removed from the removable cover;
wherein two ends of the removable cover accommodate two magnets so as to be attached on a car door threshold.

2. The illuminated door sill plate as claimed in claim 1, wherein the elongated body of the removable cover has a stepped face formed on the top thereof, two notches defined adjacent to two short sides of the top of the elongated body, and the respective notch is located adjacent to a respective short side of the elongated body and accommodates a respective magnet attached by the nameplate.

3. The illuminated door sill plate as claimed in claim 1, wherein the nameplate is made of metal, the light transmission portion of the nameplate passes through the holes or shape on the nameplate, and the lights emit out of the light transmission portion from the light emitting portion of the elongated case in three-dimensional character shapes.

4. The illuminated door sill plate as claimed in claim 1, wherein the nameplate is made of translucent plastic, the light transmission portion passes through the nameplate by in form of a shading printing manner, such that the lights emit out of the light transmission portion from the light emitting portion of the elongated case in flat character shapes.

5. The illuminated door sill plate as claimed in claim 1, wherein the removable cover includes two guide posts, and a respective guide post extends from the bottom of the elongated body and is located proximate to a respective short side of the bottom of the elongated body.

6. The illuminated door sill plate as claimed in claim 1, wherein a bottom of the base is fixed on the car door threshold of the vehicle.

\* \* \* \* \*